US006903855B2

(12) United States Patent
Aoki et al.

(10) Patent No.: US 6,903,855 B2
(45) Date of Patent: Jun. 7, 2005

(54) MULTI-BEAM SCANNING METHOD, APPARATUS AND MULTI-BEAM LIGHT SOURCE DEVICE ACHIEVING IMPROVED SCANNING LINE PITCH USING LARGE LIGHT EMITTING POINTS INTERVAL

(75) Inventors: Magane Aoki, Yokosuka (JP); Kohji Sakai, Tokyo (JP)

(73) Assignee: Ricoh Company, Ltd., Tokyo (JP)

( * ) Notice: Subject to any disclaimer, the term of this patent is extended or adjusted under 35 U.S.C. 154(b) by 206 days.

(21) Appl. No.: 09/969,982

(22) Filed: Oct. 3, 2001

(65) Prior Publication Data

US 2002/0159122 A1 Oct. 31, 2002

Related U.S. Application Data

(63) Continuation of application No. 09/333,209, filed on Jun. 15, 1999, now Pat. No. 6,366,384.

(30) Foreign Application Priority Data

Jul. 2, 1998 (JP) ............................................ 10-187697

(51) Int. Cl.[7] .............................................. G02B 26/08
(52) U.S. Cl. ....................... 359/204; 359/212; 359/216; 359/900; 347/243
(58) Field of Search ................................. 359/204, 212, 359/216–219, 900; 347/233, 238, 241–244

(56) References Cited

U.S. PATENT DOCUMENTS

| 5,251,055 A | 10/1993 | Koide | 359/216 |
| 5,834,766 A | 11/1998 | Suhara | 250/234 |
| 5,999,345 A | 12/1999 | Nakajima et al. | 359/821 |
| 6,034,806 A | 3/2000 | Inagaki et al. | 359/204 |
| 6,115,165 A * | 9/2000 | Tada | 359/204 |

FOREIGN PATENT DOCUMENTS

| JP | 3-107910 | 5/1991 |
| JP | 10-221618 A | 8/1998 |

* cited by examiner

*Primary Examiner*—James Phan
(74) *Attorney, Agent, or Firm*—Greenberg Traurig LLP; Eugene C. Rzucidlo; Joseph M. Manak

(57) ABSTRACT

A multi-beam scanning method for scanning a scanning surface with a plurality of beams which are formed into a plurality of beam spots separated from each other in a sub scanning direction includes providing n number of semiconductor laser array units, each of the n number of semiconductor laser array units having m number of light emitting points, where n is not equal to 1 and m is not equal to 1, coupling light beams emitted from the light emitting points of the semiconductor laser arrays, synthesizing the coupled beams with a beam synthesizing device to obtain m×n number of beams and deflecting the m×n number of beams at substantially the same time such that the deflected beams are impinged on the scanning surface.

26 Claims, 9 Drawing Sheets

MULTI-BEAM SCANNING METHOD, APPARATUS AND MULTI-BEAM LIGHT SOURCE DEVICE ACHIEVING IMPROVED SCANNING LINE PITCH USING LARGE LIGHT EMITTING POINTS INTERVAL

CROSS-REFERENCE TO RELATED APPLICATIONS

This application is a Continuation of application Ser. No. 09/333,209 filed Jun. 15, 1999, U.S. Pat. No. 6,366,384.

BACKGROUND OF THE INVENTION

1. Field of the Invention

The present invention relates to a multi-beam scanning method, apparatus and multi-beam light source device using a plurality of semiconductor laser array units each having a plurality of light emitting points.

2. Discussion of the Background

It is known to use a semiconductor laser array unit as a light source in a multi-beam scanning apparatus in which a plurality scanning lines are simultaneously scanned on a scanning surface with a plurality of beams which are formed as a plurality of beam spots. The beam spots are separated from each other in a sub-scanning direction on the scanning surface. The semiconductor laser array unit includes a monolithic semiconductor laser array chip having a plurality of light emitting points (laser light emitting elements) which are arranged in a row.

Japanese Patent Laid-open Publication No. 3-107910 proposes to use a semiconductor laser array unit in which two light emitting points are arranged 100 $\mu$m apart from each other.

When the imaging magnification of an optical system arranged in a light path extending from the light source to a scanning surface is considered, the distance of 100 $\mu$m is too large because when the two light emitting points are arranged in the sub scanning direction, the pitch of the scanning lines (the distance between two adjacent scanning lines) becomes excessively large.

Therefore, in JP 3-107910, a desired smaller scanning line pitch is accomplished by slightly inclining the semiconductor laser array unit such that the direction in which the light emitting points are arranged in the semiconductor laser array unit is inclined relative to the main scanning direction.

Generally, in optical scanning apparatuses, to achieve surface tilt correction for an optical deflector, the image forming magnification of an optical system which is arranged between a light source and a scanning surface differs between the main and sub scanning directions. As a result, the angle of a direction in which light emitting points are arranged in a semiconductor laser array unit relative to the main scanning direction differs from the angle of a direction in which beam spots are arranged on the scanning surface relative to the main scanning direction.

Because of this difference, it is very difficult to accurately adjust the incline angle of the semiconductor laser array unit so that a desired scanning line pitch is accomplished. Therefore, it is desirable that the semiconductor laser array unit can be used so that the arrangement direction of the light emitting points is the same as the sub scanning direction.

If the distance between the light emitting points is reduced to be very small, it is possible to prevent the scanning light pitch from becoming excessively large even when the light emitting points are arranged in a direction in accordance with the sub scanning direction. For example, if a semiconductor laser array unit in which light emitting points are spaced apart from each other by about 5 $\mu$m–7 $\mu$m is used, a sufficiently fine scanning line pitch is achieved even though the arrangement direction of the light emitting points is in accordance with the sub scanning direction. However, the manufacturing method required to produce such semiconductor laser array unit having a finer and smaller interval between light emitting points is complicated and therefor, the manufacturing cost is relatively high. As a result, the cost of a multi-beam scanning apparatus using such a semiconductor laser array unit is very high.

The manufacture of a semiconductor laser array unit becomes relatively easy if the distance between light emitting points is about 10 $\mu$m, and therefore the manufacturing cost of the semiconductor laser array unit becomes relatively low. However, if such semiconductor laser array unit having the light emitting point interval of 10 $\mu$m is used with the arrangement direction of the light emitting points is in accordance with the sub scanning direction, the scanning line pitch on the scanning surface becomes excessively large, particularly when a fine density scanning line pitch is desired.

SUMMARY OF THE INVENTION

In order to overcome the above-described and other problems with related apparatuses, preferred embodiments of the present invention provide a novel method of easily accomplishing a desired scanning line pitch while using a semiconductor laser array unit having light emitting points which are spaced apart from each other by a relatively large distance and which are arranged such that the direction of arranging the light emitting points in the semiconductor laser array unit coincides with the sub scanning direction.

According to one preferred embodiment of the present invention, a multi-beam scanning method for scanning a scanning surface with a plurality of beams which are formed into a plurality of beam spots separated from each other in a sub scanning direction, includes the steps of providing n number of semiconductor laser array units, each of the n number of semiconductor laser array units having m number of light emitting points, where n is not equal to 1 and m is not equal to 1, coupling light beams emitted from the light emitting points of the semiconductor laser array units, synthesizing the coupled beams with a beam synthesizing device to obtain m×n number of beams, and deflecting the m×n number of beams at substantially the same time such that the deflected beams are impinged on the scanning surface.

It should be noted that when n=2, m can be equal to 2, 3, 4, 5 or 6. When m=2, n can be equal to 2, 3, 4, 5 or 6.

According to another preferred embodiment of the present invention, a multi-beam scanning apparatus includes n number of semiconductor laser array units, each of the n number of semiconductor laser array units having m number of light emitting points, where n is not equal to 1 and m is not equal to 1, at least one coupling lens arranged to couple beams emitted from the light emitting points of the laser semiconductor array units, a beam synthesizing device arranged to synthesize the coupled beams to obtain m×n number of beams, and an optical deflector arranged to deflect the m×n number of beams at substantially the same time such that the deflected beams are impinged on a scanning surface.

According to another preferred embodiment of the present invention, a n image forming apparatus including n number of semiconductor laser array units, each of the n number of semiconductor laser array units having m number of light emitting points, where n is not equal to 1 and m is not equal to 1, at least one coupling lens arranged to couple beams emitted from the light emitting points of the laser semiconductor array units, a beam synthesizing device arranged to synthesize the coupled beams to obtain m×n number of beams, and an optical deflector arranged to deflect the m×n number of beams at substantially the same time such that the deflected beams are impinged on a scanning surface.

BRIEF DESCRIPTION OF THE DRAWINGS

A more complete appreciation of the present invention and many of the attendant advantages thereof will be readily obtained as the same becomes better understood by reference to the following detailed description thereof when considered in conjunction with accompanying drawings, wherein.

DETAILED DESCRIPTION OF THE PREFERRED EMBODIMENTS

Figure 1A:
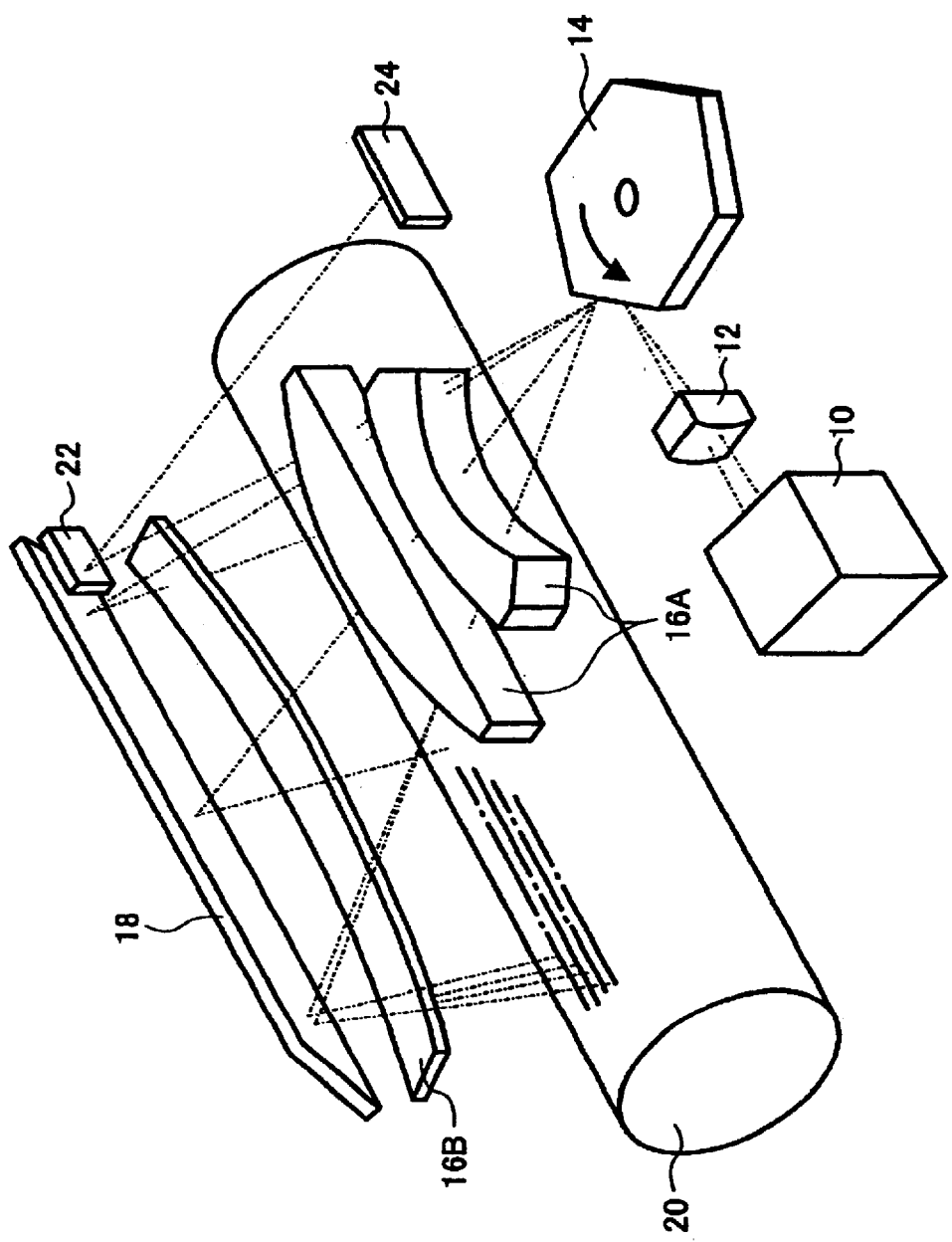
FIG. 1(a) is a schematic drawing illustrating a preferred embodiment of a multi-beam scanning apparatus according to the present invention.

Referring now to the drawings, wherein like reference numerals designate identical or corresponding devices throughout several views, preferred embodiments of the present invention are now described.

FIG. 1(a) schematically illustrates a preferred embodiment of a multi-beam scanning apparatus according to the present invention. The scanning apparatus can scan a scanning surface with a plurality beam spots which simultaneously move over the scanning surface.

According to one example shown in FIG. 1(a), four synthesized beams emitted from a multi-beam light source 10 which are coupled via a coupling lens to be a weak diverging or converging beam, are then converged in a sub scanning direction by a cylinder lens 12 which is arranged to function as a common linear image forming optical system to form four linear images, each extending in the main scanning direction and being separated from each other in the sub scanning direction.

A polygonal mirror 14 which defines an optical deflector has a deflecting reflective surface located near the position where the above-described four linear images are formed and deflects the four beams substantially simultaneously at equiangular velocity. The deflected beams are condensed as four beam spots being separated from each other in the sub scanning direction on a surface of a photoconductor 20 which defines a scanning surface, via lenses 16A and 16B functioning as a common optical scanning and image forming system so as to scan the scanning surface. The optical path of the deflected beams is folded by a mirror 18 located between the lenses 16A and 16B. Further, a beam deflected toward a scanning start position is reflected by a mirror 22 toward a light receiving element 24, which then generates a beam receiving signal upon receiving the beam. A control device (not shown) generates a scanning start synchronizing signal in accordance with the beam receiving signal, and image writing starts in accordance with the scanning start synchronizing signal.

Figure 1B:
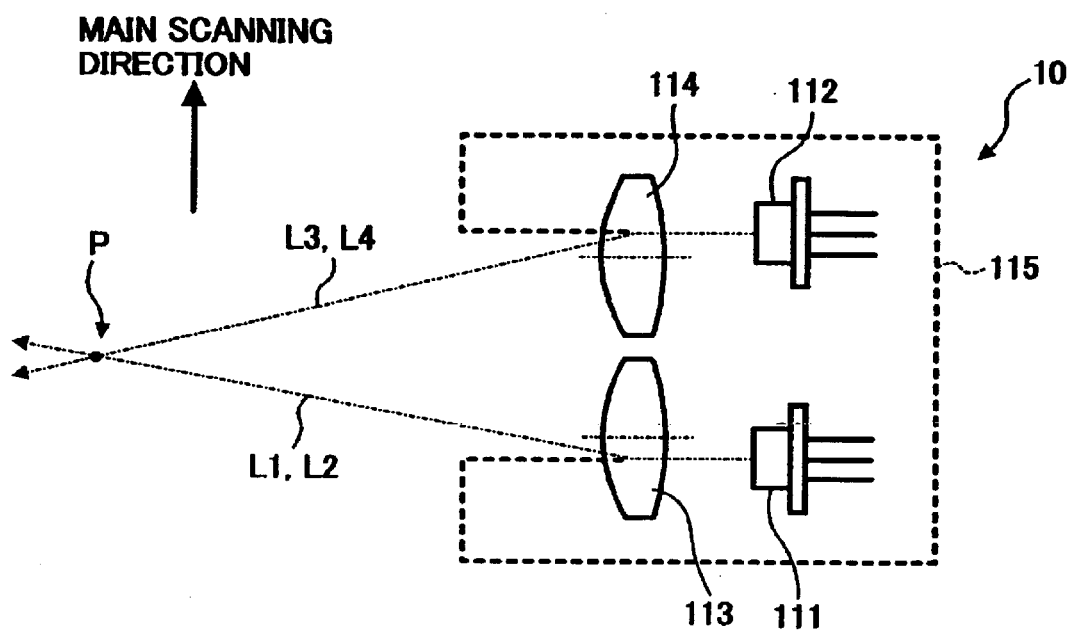
FIG. 1(b) is a schematic drawing illustrating a preferred embodiment of a multi-beam light source device according to the present invention.

FIG. 1(b) schematically illustrates a multi-beam light source device according to a preferred embodiment of the present invention. In this preferred embodiment, it is preferable that two semiconductor laser array units 111, 112 and two corresponding coupling lenses 113, 114 are integrated via a casing 115 so as to define a single unitary body. However, as described below, the number of semiconductor laser array units may be 2, 3, 4 and 6 and the number of light emitting elements in each of the laser array units may be 2, 3, 4 and 6 depending on the number of laser array units.

Figure 1C:
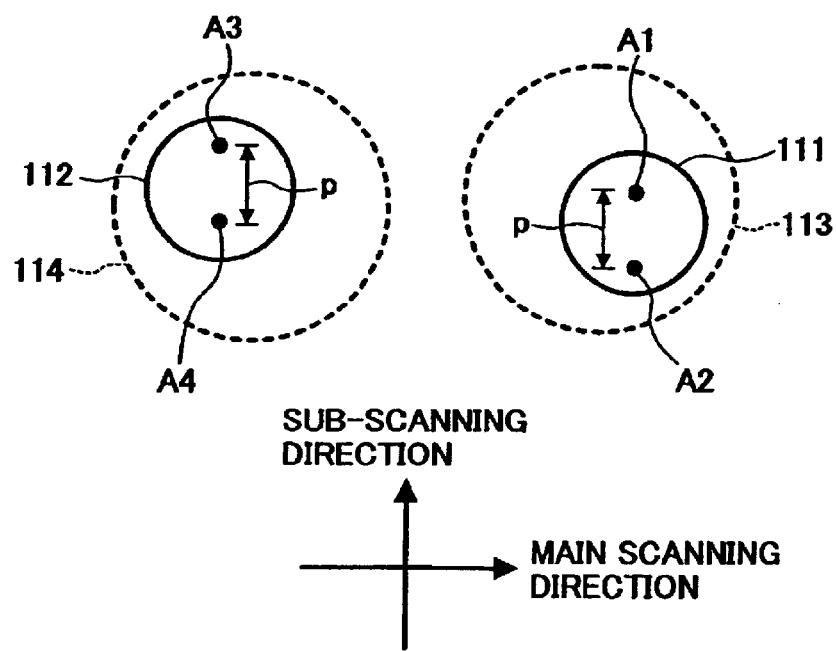
FIG. 1(c) is a schematic drawing illustrating semiconductor laser array units viewed from an optical axial direction of coupling lenses in the multi-beam source device of FIG. 1(b)

FIG. 1(c) illustrates the semiconductor laser array units 111, 112 viewed from an optical axial direction of the coupling lens 113, 114. The vertical direction in FIG. 1(c) corresponds to the sub scanning direction and the lateral direction in FIG. 1(c) corresponds to the main scanning direction. The semiconductor laser array units 111,112 are preferably identical and the distance between the light emitting points are denoted by "p".

The semiconductor laser 111 preferably has two light emitting points A1, A2 and the semiconductor laser array unit 112 preferably has also two light emitting points A3, A4. The light emitting points A1, A2 of the semiconductor laser array unit 111 and the light emitting points A3, A4 of the semiconductor laser array unit 112 are respectively arranged so as to be separated from each other in the sub scanning direction.

Respective centers of the semiconductor laser array units 111, 112 (the arrangement center of the light emitting points) are arranged so as to be separate from corresponding centers (optical axis) of the coupling lenses 113,114 with respect to the main scanning direction. Therefore, as illustrated in FIG. 1(b), beams L1, L2, L3, L4 emitted from the semiconductor laser array units 111, 112 and coupled by the coupling lenses 113, 114 are synthesized and emitted such that the beams L1, L2 and the beams L3, L4 cross each other in the main scanning direction, that is, in the vertical direction in FIG. 1(b). By setting the crossing point "P" near the surface of the deflecting reflective surface of the polygonal mirror 14, the deflecting reflective surface can be made small and thereby the polygonal mirror can be made compact.

As illustrated in FIG. 1(c), the respective centers of the semiconductor laser array units 111, 112 are deviated from the corresponding centers of the coupling lens 113, 114 in the sub scanning direction also. Therefore, the beams emitted from the respective light emitting points of the semiconductor laser array units are condensed on the scanning surface as beam pots separated from each other in the sub scanning direction.

As described above, the multi-beam light source device illustrated in FIGS. 1(b) and 1(c) includes in an integrated, unitary body preferably n number of semiconductor laser array units, where n is preferably two. Each of the semiconductor laser array units preferably has m number of light emitting points A1, A2 (A3, A4), where m preferably equals two in this preferred embodiment. The light emitting points are arranged in a row in the sub scanning direction and are separated from each other by a distance p. The multi-beam light source device also includes n number of coupling lenses, each corresponding to a respective one of the semiconductor laser array units. The semiconductor laser array units 111, 112 and the coupling lenses 113, 114 are positioned such that beams L1, L2, L3, L4 emitted from the semiconductor laser array units 111, 112 and coupled by the coupling lenses 113, 114 cross each other in the main scanning direction.

Further, as described above, the multi-beam scanning apparatus illustrated in FIG. 1(a) uses the multi-beam light source 10 as described above and forms a plurality of synthesized beams emitted from the multi-beam light source 10 into a plurality of linear images, each extending in the main scanning direction and being separated from each other by a common optical linear image forming system 12. The plurality of beams are simultaneously deflected by the optical deflector 14 having the deflecting reflective surface near where the linear images are formed such that the deflected beams are condensed via the common optical scanning and image forming system 16A, 16B on the scanning surface 20. As a result, a plurality of beam spots, each being separated from each other in the sub scanning direction, are produced so as to scan the scanning surface with the plurality of beam spots.

Figure 2:
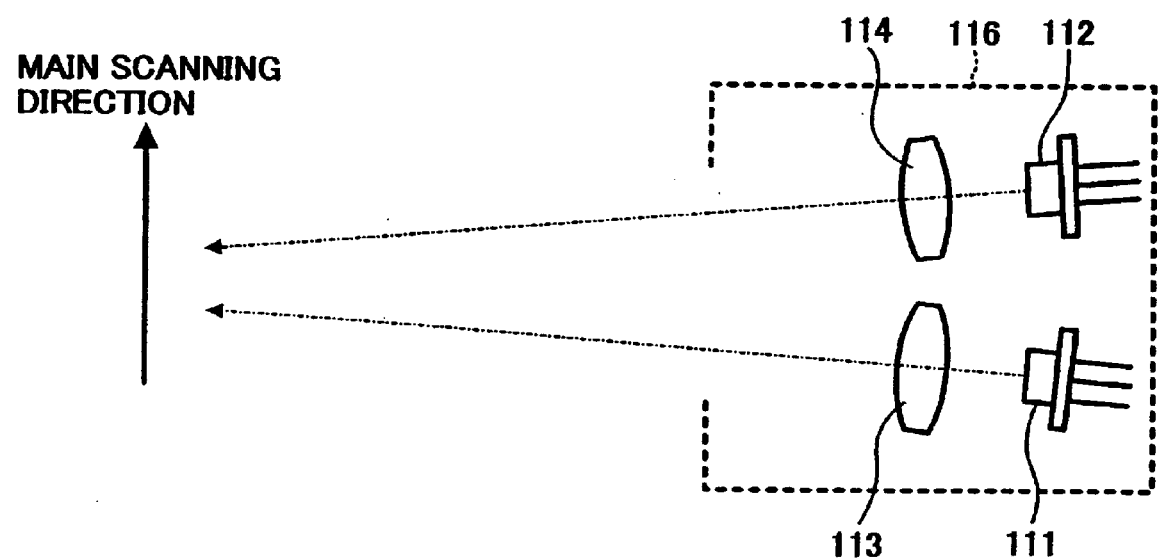
FIG. 2 is a schematic drawing illustrating another preferred embodiment of a multi-beam light source device according to the present invention.

FIG. 2 schematically illustrates another example of a multi-beam light source according to preferred embodiments of the present invention.

Two semiconductor laser array units 111, 112 and corresponding coupling lenses 113, 114 are preferably integrally disposed with a casing 116 to define a single unitary body. Optical axes of the coupling lenses 113, 114 are inclined such that the optical axes cross each other in the main scanning direction near a deflecting reflective surface of an optical deflector. Respective centers of the semiconductor laser array units 111, 112 coincide with the optical axes of the corresponding coupling lenses with respect to the main scanning direction and are deviated with respect to the sub scanning direction.

Figure 3A:
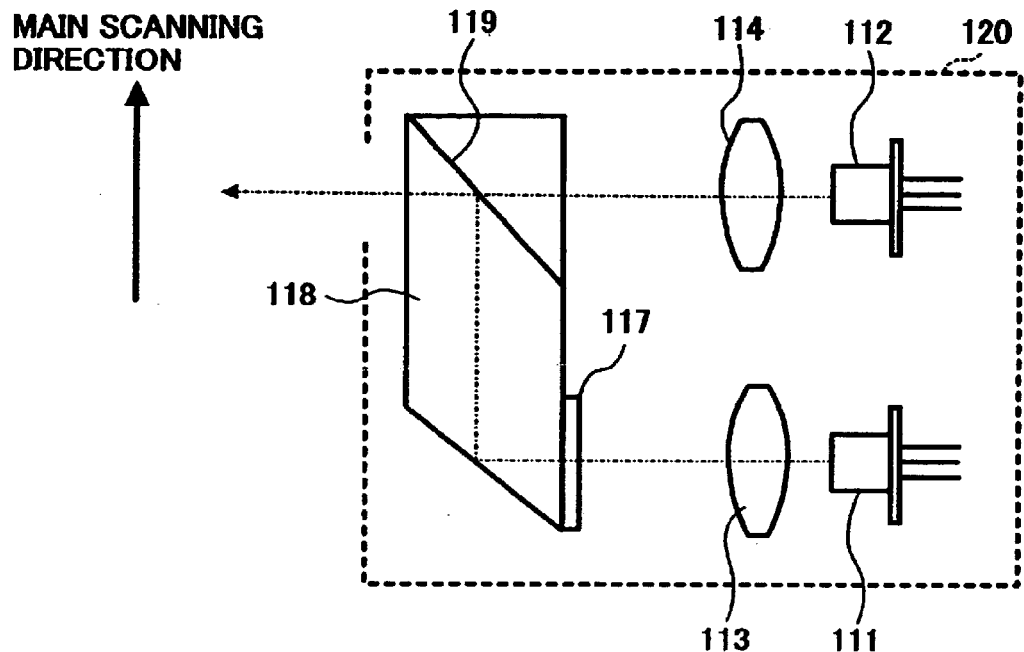
FIG. 3(a) is a schematic drawing illustrating still another preferred embodiment of a multi-beam light source device according to the present invention.

FIG. 3(a) illustrates another example of a multi-beam light source according to preferred embodiments of the present invention. Semiconductor laser array units 111, 112, coupling lenses 113, 114, a ½ wavelength plate 117, and a beam synthesizing prism 118 are arranged and integrated in a common casing 120 so as to define a single unitary body.

Figure 3B:
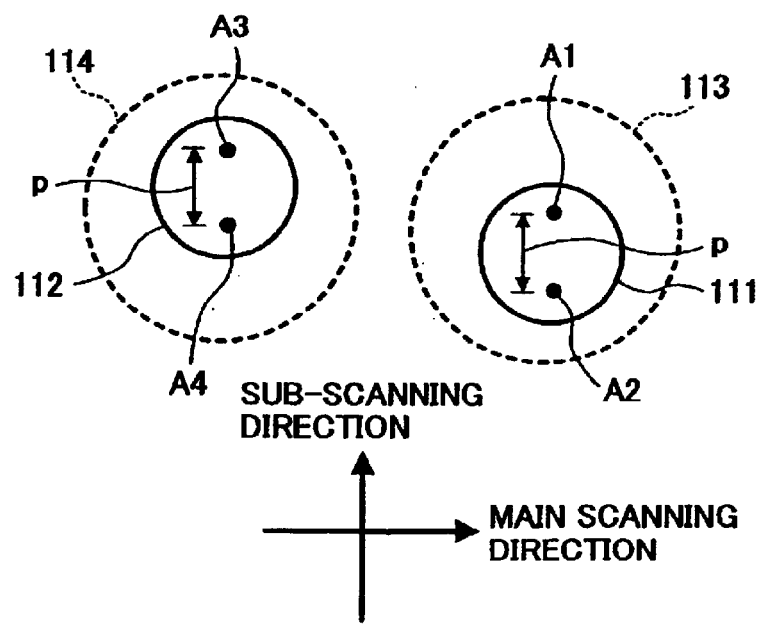
FIG. 3(b) is a schematic drawing illustrating semiconductor laser array units viewed from an optical axial direction of coupling lenses in the multi-beam source device of FIG. 3(a)

As illustrated in FIG. 3(b), the semiconductor laser array unit 111 is disposed such that the direction in which two light emitting points A1, A2 are arranged in a row while being separated from each other by a space p, is the same as the sub scanning direction and such that the center of the semiconductor laser array unit 111 is slightly deviated in the sub scanning direction relative to the optical axis of the coupling lens 113. Similarly, the semiconductor laser array unit 112 is disposed such that the direction in which two light emitting points A3, A4 are arranged in a row while being separated from each other by a space p, coincides with the sub scanning direction and such that the center of the semiconductor laser array unit 112 is slightly deviated in the sub scanning direction relative to the optical axis of the coupling lens 114.

A beam emitted from each light emitting point of the semiconductor laser array unit 111 is coupled by the coupling lens 113, deflected by about 90 degrees by the ½ wavelength plate 117, reflected by a reflective surface of the beam synthesizing prism 118, reflected by a polarizing/separating film 119, and then emitted from the beam synthesizing prism 118. A beam emitted from each light emitting points of the semiconductor laser array unit 112 is coupled by the coupling lens 114, passes through the polarizing/separating film 119 and then is emitted from the beam synthesizing prism 118. Thus, four beams are preferably synthesized in this preferred embodiment. The synthesized beams are separated from each other in the sub scanning direction but are in the same plane in the main scanning direction. In addition, the polarized state of the synthesized beams may be converted to circular polarization by the ¼ wavelength plate.

As described above, the multi-beam light source device illustrated in FIGS. 3(a) and 3(b) integrally includes n number of semiconductor laser array units 111, 112, each having m number of light emitting points arranged in a row in the sub scanning direction while being separated from each other, n number of coupling lenses 113, 114 corresponding to a respective one of the semiconductor laser array units 111, 113, and the beam synthesizing prism 117, 118 for synthesizing each beam, which is coupled by the corresponding coupling lens and is constructed to use a difference in the polarized state of each beam for synthesizing the beams. The above-described multi-beam light source can be used in the multi-beam scanning apparatus illustrated in FIG. 1(a).

In the above preferred embodiments, two semiconductor laser array units having two emitting points are preferably used. However, two semiconductor laser array units, each having more than three light emitting points, may be used so that more than 6 beams are synthesized. Also, three or more semiconductor laser array units each having more than two light emitting points can be used so that more than six beams are synthesized and emitted.

Figure 4:
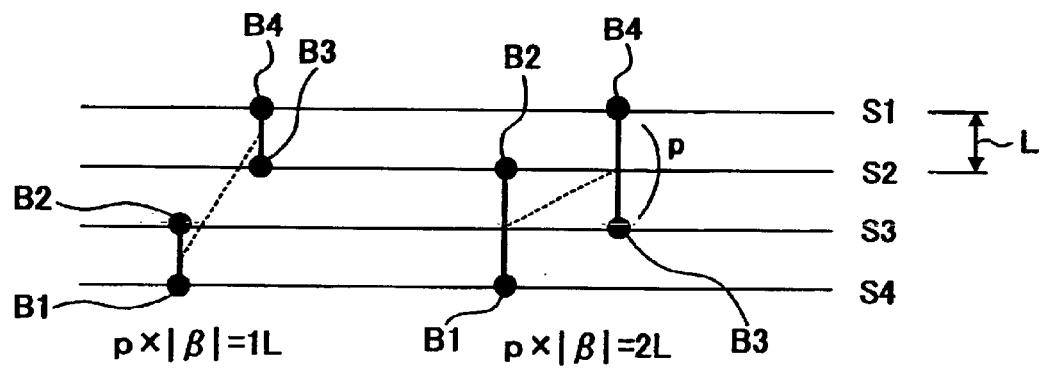
FIG. 4 is a diagram illustrating an example of arrangement of beam spots for explaining a method of multi-beam scanning according to a preferred embodiment of the present invention.

In the preferred embodiment of FIG. 1(a), the scanning surface is preferably scanned with four scanning lines at the same time. Each of the two semiconductor laser array units provided in the multi-beam light source device 10 preferably has two light emitting points. The light emitting points are arranged in the sub scanning direction at the interval of p. Accordingly, the multi-beam light source 10 emits four synthesized beams (K=4). These four beams can be condensed as beam spots on the scanning surface in two ways as illustrated in FIG. 4. In a first way, the beam spots from each of the two semiconductor laser array units are arranged in succession in the sub scanning direction as illustrated at the left part of FIG. 4. In a second way, the beam spots from the two semiconductor laser array units are alternately arranged at equal intervals as illustrated at the right part of the FIG. 4.

Assuming the four scanning lines are S1–S4, a scanning line pitch (an interval between adjacent scanning lines) is L, a lateral magnification in the sub scanning direction of the optical image forming system (the coupling lenses 113, 114, the cylindrical lens 12, the optical scanning image forming system 16A, 16B) is β, beam spots which are formed by beams emitted from the light emitting points A1 –A4 are B1–B4, in the arrangement illustrated at the left part of FIG. 4, because the relationship between the light emitting points interval p and the scanning line pitch L is expressed by p×|β|=L, {p×|β|/L}=1 is satisfied. In the arrangement illustrated in the right part of FIG. 4, because p×|β|=2L, {p×|β|/L}=2 is satisfied. Because K=4 and m=2, (K/m)=2. Therefore in the arrangement illustrated in FIG. 4, n is evenly divided by {p×|β|/L}.

Now, specific examples of preferred embodiments of the present invention will be described.

EXAMPLE 1

First, an example in which 600 dpi (dot-per-inch) resolution is obtained in the sub scanning direction by scanning with four adjacent beam spots is described. The scanning line pitch L for the 600 dpi resolution is calculated as follows; L=25.4 mm/600=0.0423 mm. Assuming |β| is 3.0, because p×|β|=L in the arrangement in the left part of FIG. 4, the interval between light emitting points P is calculated as follows: P=0.0423/3.0=0.0141 mm. Thus, a semiconductor laser array unit which has an interval between the light emitting points of about 14 μm and which therefore can be manufactured at relatively low cost, can be used.

In the arrangement illustrated in the right part of FIG. 4, because p×|β|=2L, the light emitting points interval p is obtained as follows: p=2L/|β|=2×0.423/3.0=0.0282. Thus, a semiconductor laser array unit having an even smaller interval between light emitting points of about 28 μm, which can be manufactured at a lower cost, can be used. In this preferred embodiment, because the resolution (scanning density) is 600 dpi and is relatively low, the scanning line pitch can be obtained using the semiconductor laser array units which have an interval between the light emitting points of about 14 μm and in which the light emitting points are arranged in a row in the sub scanning direction.

That is, a semiconductor laser array unit which has a relatively large interval between the light emitting points and which thereby can be manufactured at a low cost can be used by setting the interval between light emitting points p, the number of semiconductor laser array units n, the number of beams K, the lateral magnification β, the scanning line pitch L, such that n is evenly divided by {p×|β|/L}. In actuality, because the lateral magnification β varies +/−15% depending upon the position of writing in the main scanning direction and such variation can be allowed in the image forming operation, n is not required to be exactly evenly divided by {p×|β|/L} and can be a value that is substantially close to a value that would be evenly divided by {p×|β|/L}. How close the value should be to such a value that would be evenly divided by {p×|β|/L} is determined based upon the allowed level in relation to the image forming operation.

Figure 5:
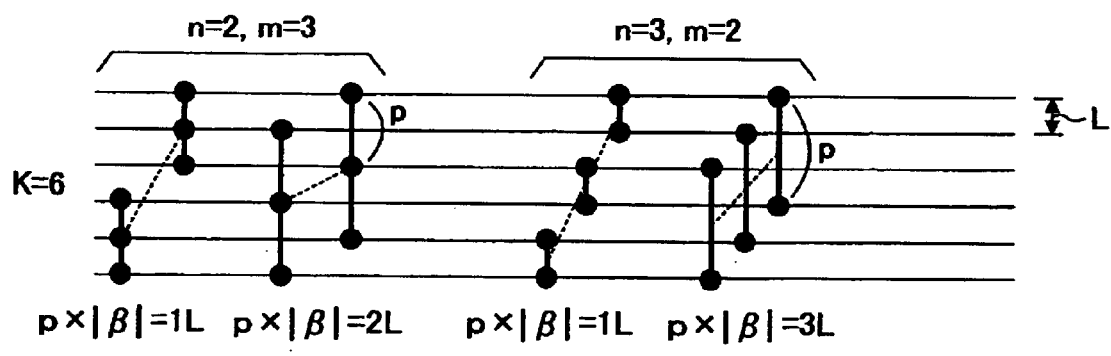
FIG. 5 is a diagram illustrating another example of arrangement of beam spots for explaining another method of multi-beam scanning according to a preferred embodiment of the present invention.

FIG. 5 illustrates arrangement of beam spots on the scanning surface when 6 beams scans the scanning surface at substantially the same time.

As in FIG. 4, lateral lines indicate scanning lines and black dots indicate beam spots. The vertical direction in FIG. 4 corresponds to the sub scanning direction. Beam spots connected with a vertical line are emitted from the same semiconductor laser array unit.

When the number of semiconductor laser array units is 2 (n=2) and the number of light emitting points is 3 (m=3), two arrangements illustrated at the left part of FIG. 5, that is, both of the relationships, p×|β|=L and p×|β|=2L, are possible. Accordingly, a semiconductor laser array unit having a smaller interval between light emitting points of 14 m or 28 m, which can be manufactured at a lower cost, can be used. When the number of semiconductor laser array unit is 3 (n=3) and the number of light emitting points is 2 (m=2), two arrangements illustrated at the right part of FIG. 5, that is, both of the relationships, p×|β|=L and p×|β|=3L, are possible. Accordingly, a semiconductor laser array unit having an interval between light emitting points of about 14 μm or about 42 μm can be used.

Figure 6:
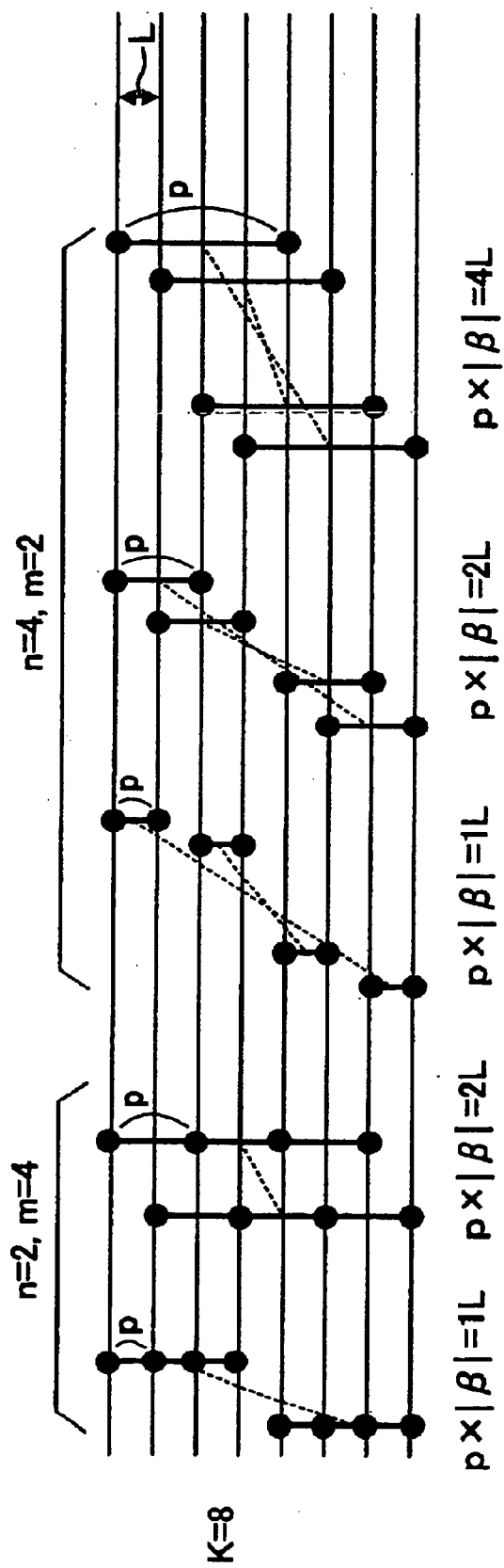
FIG. 6 is a diagram illustrating still another example of arrangement of beam spots for explaining another method of multi-beam scanning according to a preferred embodiment of the present invention.

FIG. 6 illustrates arrangement of beam spots on the scanning surface in a similar manner as for FIG. 5 when 8 beam spots scan the scanning surface at substantially the same time.

When the number of semiconductor laser array units is 2 (n=2) and the number of light emitting points is 4 (m=4), two arrangements illustrated at the left part of FIG. 6, that is, both of the relationships, p×|β|=L and p×|β|=2L, are possible. Accordingly, a semiconductor laser array unit having a smaller interval between light emitting points of about 14 μm or about 28 μm, which can be manufactured at a lower cost, can be used. When the number of semiconductor laser array unit is 4 (n=4) and the number of light emitting points is 2 (m=2), three arrangements illustrated at the left part of the drawing, that is, all of the relationships, p×|β|=L, p×|β|=2L, p×|β|=4L are possible. Accordingly, a semiconductor laser array unit having an interval between light emitting points of about 14 μm or about 28 μm or about 56 μm can be used.

Figure 7:
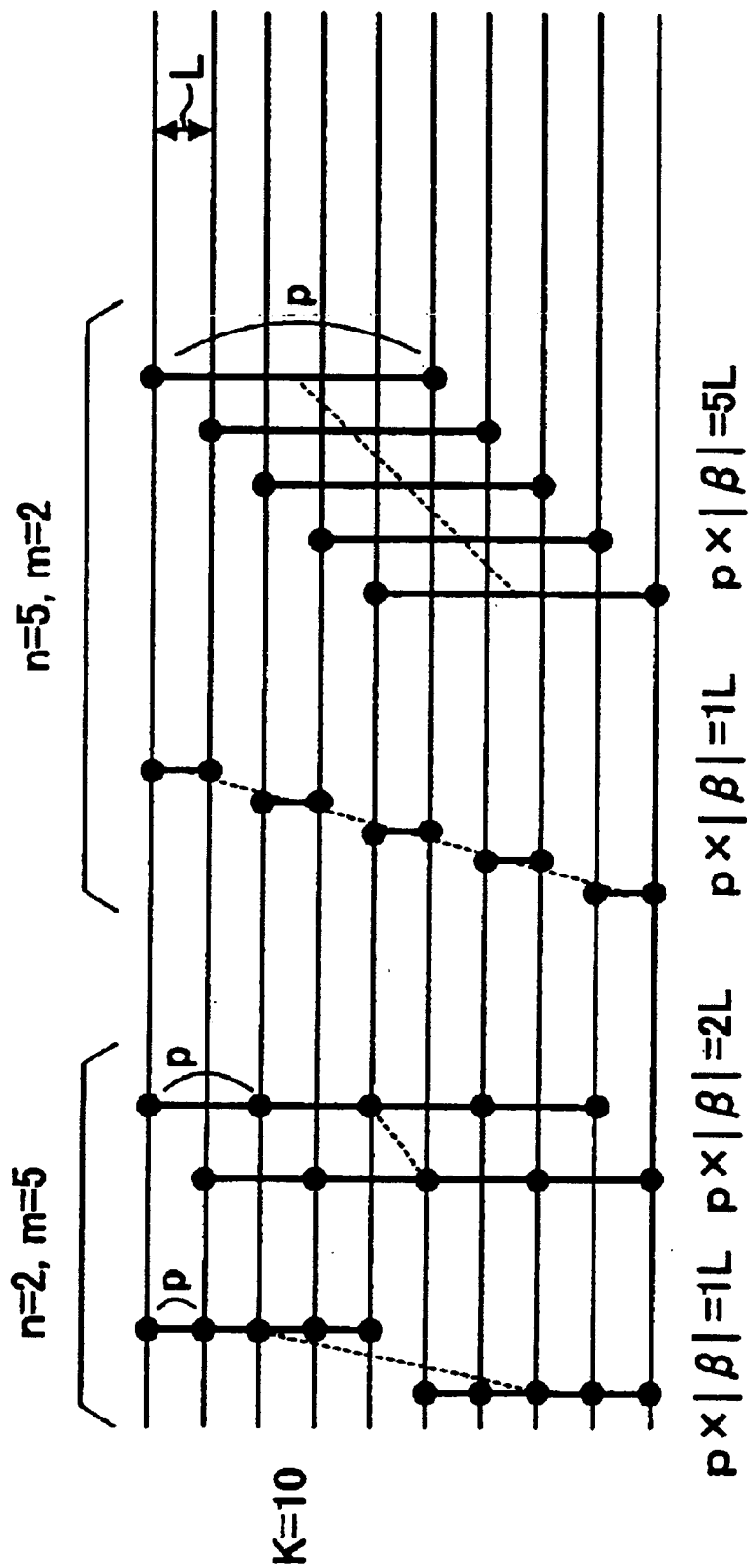
FIG. 7 is a diagram illustrating still another example of arrangement of beam spots for explaining another method of multi-beam scanning according to a preferred embodiment of the present invention.

FIG. 7 illustrates arrangement of beam spots on the scanning surface in a similar manner as for FIG. 5 when 10 beam spots scan the scanning surface at the same time.

When the number of semiconductor laser array units is 2 (n=2) and the number of light emitting points is 5 (m=5), two arrangements illustrated at the left part of FIG. 7, that is, both of the relationships, p×|β|=L and p×|β|=2L, are possible. When the number of semiconductor laser array units is 5 (n=5) and the number of light emitting points is 2 (m=2), two arrangements illustrated at the left part of the drawing, that is, the relationships, p×|β|=L and p×|β|=5L are possible.

Figure 8A:
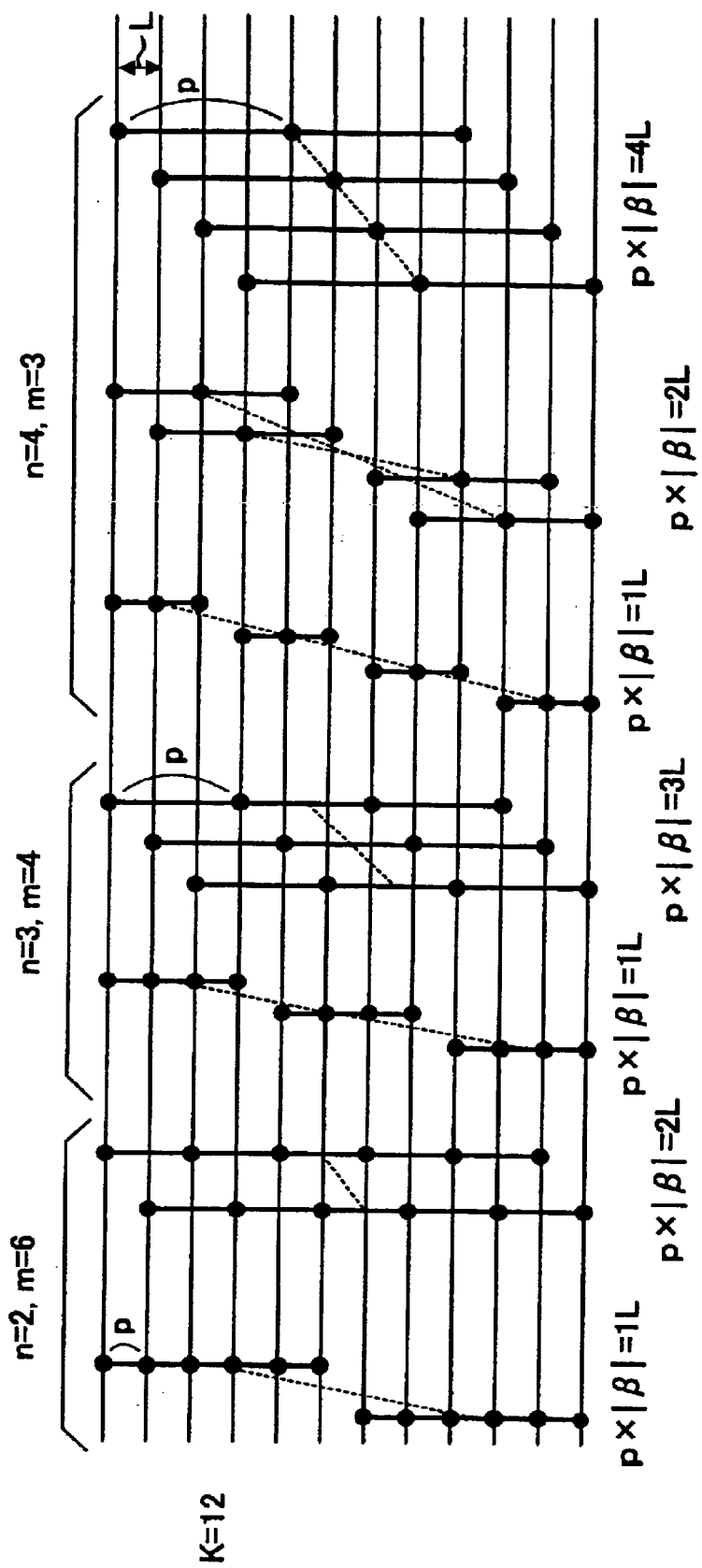
FIGS. 8(a) and 8(b) are diagrams illustrating still another example of arrangement of beam spots for explaining another method of multi-beam scanning according to preferred embodiments of the present invention.
Figure 8B:
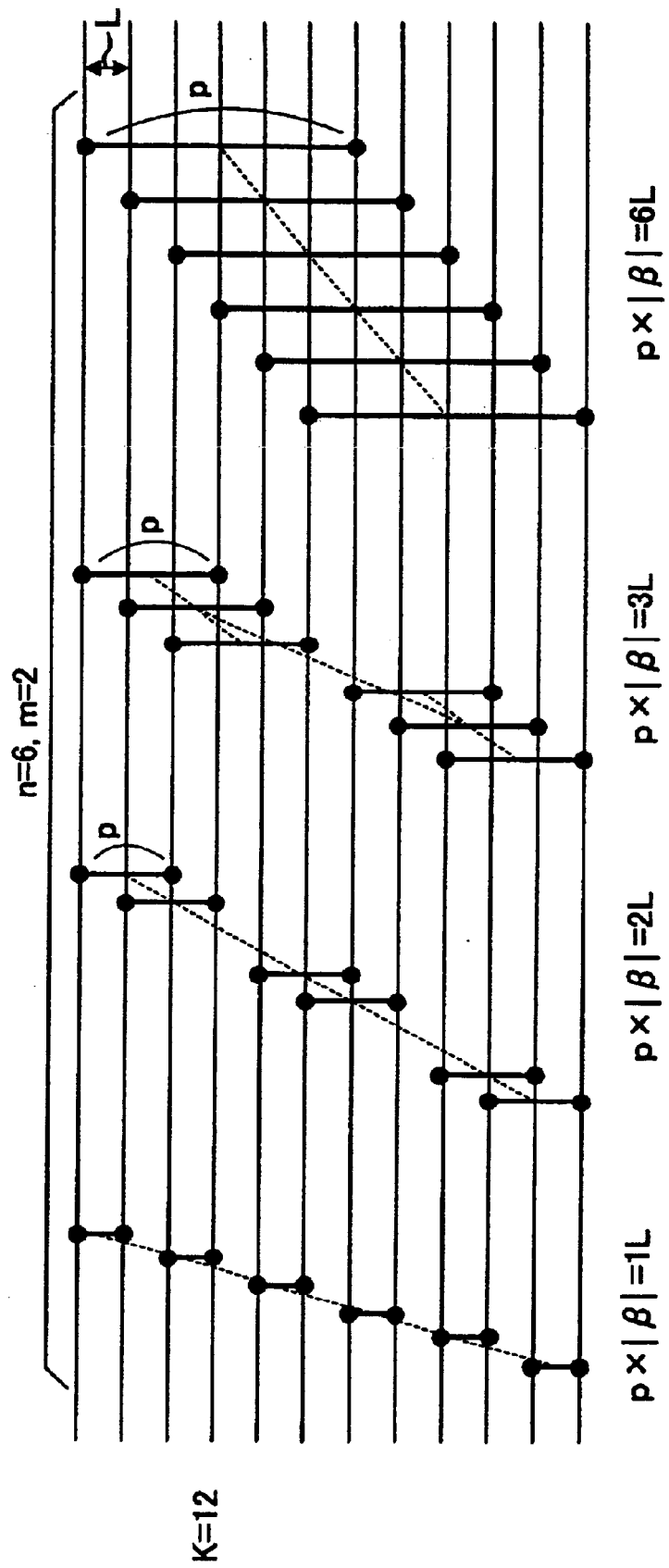

FIGS. 8(*a*) and 8(*b*) illustrates in a similar manner as for FIG. 5 an arrangement of beam spots on the scanning surface when 12 beam spots scans the scanning surface at substantially the same time.

When the number of semiconductor laser array units is 2 (n=2) and the number of light emitting points is 6 (m=6), two arrangements illustrated at the left part of FIG. 8(*a*), that is, both of the relationships, p×|β|=L and p×|β|=2L, are possible. When the number of semiconductor laser array units is 3 (n=3) and the number of light emitting points is 4 (m=4), two arrangements illustrated at the middle part of FIG. 8(*a*), that is, the relationships, p×|β|=L and p×|β|=3L are possible.

When the number of semiconductor laser array units is 4 (n=4) and the number of light emitting points is 3 (m=3), three arrangements illustrated at the left part of FIG. 8(*a*), that is, all of the relationships, p×|β|=L, p×|β|=2L and p×|β|=4L are possible. When the number of semiconductor laser array units is 6 (n=6) and the number of light emitting points is 2 (m=2), four arrangements illustrated in FIG. 8(*b*), that is, the relationships, $p \times |\beta|=L$, $p \times |\beta|=2L$, $p \times |\beta|=3L$ and $p \times |\beta|=6L$ are possible.

EXAMPLE 2

Next, an example in which 1200 dpi (dot-per-inch) resolution is obtained in the sub scanning direction by scanning with eight adjacent beams is described.

The scanning line pitch L for the 1200 dpi resolution is calculated as follows: L=25.4 mm/1200=0.0212 mm. Assuming $|\beta|$ is 3.0, when two semiconductor laser array units, each having four light emitting points, are used, a semiconductor laser array unit having either arrangement with $p=L/|\beta|$ or $p=2L/|\beta|$ relationship can be used. In a case of a semiconductor laser array unit having arrangement with $p=L/|\beta|$, because p=0.0212/3.0=0.007, a semiconductor laser array unit having an interval between the light emitting points of about 7 μm is required. However, in a case of a semiconductor laser array unit having arrangement with $p=2L/|\beta|$, because p=2×0.0212/3.0=0.0141, a semiconductor laser array unit which has an interval between the light emitting points of about 14 μm and which can be thereby manufactured at a low cost can be used.

When four semiconductor laser array units, each having two light emitting points, are used, a semiconductor laser array unit having arrangement of $p=L/|\beta|$ or $p=2L/|\beta|$ or $p=4L/|\beta|$ can be used.

Because the scanning density is high (1200 dpi), with the arrangement of $p=L/|\beta|$, from p=0.0211/3.0=0.00707 mm, a semiconductor laser array unit having an interval between the light emitting points of about 7 μm is required. However, with the arrangement of $p=4L/|\beta|$, from p=4×00212/3.0=0.0282 mm, a semiconductor laser array unit which has an interval between the light emitting points of about 28 μm and which can be thereby manufactured at a low cost can be used.

When ten beam spots scan the scanning surface to obtain the resolution of 1200 dpi, referring to FIG. 7, when two semiconductor laser array units, each having four light emitting points are used, a semiconductor laser array unit having arrangement of $p \times |\beta|=1L$ or $p \times |\beta|=2L$ can be used. Accordingly, semiconductor laser array units having an interval between light emitting points of about 7 m or 14 m can be used. When five semiconductor laser array units, each having two light emitting points, a semiconductor laser array unit having arrangement of $p \times |\beta|=1L$ or $p \times |\beta|=5L$ can be used. Accordingly, semiconductor laser array units having an interval between light emitting points of about 7 μm or about 35 μm can be used.

When 12 beam spots scans the scanning surface to obtain the resolution of 1200 dpi, referring to FIG. 8, when two semiconductor laser array units, each having six light emitting points, are used, a semiconductor laser array unit having arrangement of $p \times |\beta|=1L$ or $p \times |\beta|=2L$ can be used. When three semiconductor laser array units, each having four light emitting points, are used, a semiconductor laser array unit having arrangement of $p \times |\beta|=1L$ or $p \times |\beta|=3L$ can be used. When four semiconductor laser array units, each having three light emitting points, are used, a semiconductor laser array unit having arrangement of $p \times |\beta|=1L$ or $p \times |\beta|=2L$ or $p \times |\beta|=4L$ can be used. When six semiconductor laser array units, each having two light emitting points, are used, a semiconductor laser array unit having arrangement of $p \times |\beta|=1L$, $p \times |\beta|=2L$, $p \times |\beta|=3L$, $p \times |\beta|=4L$ or $p \times |\beta|=6L$ can be used. Accordingly, semiconductor laser array units having an interval between light emitting points of approximately 7 μm, 14 μm, 21 μm, 28 μm or 42 μm can be used.

When a plurality of semiconductor laser array units are arranged such that beam spots from the plurality of semiconductor laser array units scans the scanning surface with each beam spot skipping a certain number of scanning lines when the plurality of semiconductor laser array units scan the surface at the same time, the pitch: L of the scanning lines which are scanned at the same time can be further enlarged, and therefore, a semiconductor laser array unit which has a much larger light emitting points interval and which can be thereby manufactured at a much low cost can be used.

EXAMPLE 3

When eight beam spots scan the scanning surface to obtain the scanning resolution of 1200 dpi with each beam skipping three adjacent scanning lines, assuming $|\beta|=3.0$, because the scanning line pitch L is calculated as: L=(25.4 mm/1200)×3=0.0635 mm, when $p=1L/|\beta|$, p=0.0645/3.0=0.212 mm. Therefore, a semiconductor laser array units which has an interval between the light emitting points of about 21 μm and in which the light emitting points are arranged in a row in the sub scanning direction can be used. When $p=4L/|\beta|$, p=4×1.0635/3.0=0.0847 mm. Therefore, a semiconductor laser array unit which has an interval between light emitting points of about 85 μm can be used. In both cases, the light emitting points interval of the semiconductor laser array units is larger than those in background devices, and therefore the manufacturing cost of a multi-beam light source device using such semiconductor laser array units is reduced.

EXAMPLE 4

When eight beam spots scan the scanning surface with each beam spot skipping nine adjacent scanning lines for obtaining the scanning resolution of 1200 dpi, assuming $|\beta|=3.0$, the scanning line pitch L is calculated as; L=(25.4 mm/1200)×9=0.1905 mm, and when $p=1L/|\beta|$, p=0.1905/3.0=0.0635 mm. Therefore, a semiconductor laser array units which has the light emitting points interval of about 63 μm and in which the light emitting points are arranged in a row in the sub scanning direction can be used. When $p=4L/|\beta|$, p=4×0.1905/3.0=0.254 mm. Therefore, a semiconductor laser array unit which has the light emitting point interval of about 254 μm can be used. In both cases, the light emitting points interval of the semiconductor laser array units is larger than those in background devices, and therefore the manufacturing cost of a multi-beam light source using such semiconductor laser array units is reduced.

Numerous additional modifications and variations of the present invention are possible in light of the above teachings and disclosure. It is therefore to be understood that within the scope of the appended claims, the present invention may be practiced otherwise than as specifically described herein.

The document claims priority and contains subject matter related to Japanese patent application No. 10-187697 filed in the Japanese Patent Office on Jul. 2, 1998, the entire content of which is hereby incorporated by reference.

What is claimed is:

1. A multi-beam scanning method for scanning a scanning surface with a plurality of beams which are formed into a plurality of beam spots separated from each other in a sub scanning direction, the method comprising the steps of:
   providing n number of semiconductor laser array units, each of the n number of semiconductor laser array units having m number of light emitting points, where n is greater than 1 and m is greater than 1;

inclining the direction of each light emitting point in each semiconductor laser array unit to coincide with the sub-scanning direction;

coupling light beams emitted from the light emitting points of the semiconductor laser array units;

synthesizing the coupled beams with a beam synthesizing device to obtain m×n number of beams; and deflecting the m×n number of beams at substantially the same time such that the deflected beams are impinged on the scanning surface.

2. The multi-beam scanning method of claim 1, wherein n=2 and m is equal to one of 2, 3, 4, 5 or 6.

3. The multi-beam scanning method of claim 1, wherein m=2 and n is equal to one of 2, 3, 4, 5 or 6.

4. The method of claim 1, further comprising the step of forming an optical image with a common image forming optical system by condensing the beams from the light emitting points on the scanning surface as beam spots separated from each other in the sub scanning direction.

5. A multi-beam scanning apparatus comprising:

n number of semiconductor laser array units, each of the n number of semiconductor laser array units having m number of light emitting points, where n is greater than 1 and m is greater than 1;

at least one coupling lens arranged to couple beams emitted from the light emitting points of the laser semiconductor array units;

a beam synthesizing device arranged to synthesize the coupled beams to obtain m×n number of beams; and an optical deflector arranged to deflect the m×n number of beams at substantially the same time such that the deflected beams are impinged on a scanning surface, wherein the light emitting points of the semiconductor laser array units are inclined in a direction that coincides with the sub-scanning direction.

6. The apparatus of claim 5, wherein n=2 and m is equal to one of 2, 3, 4, 5, or 6.

7. The apparatus of claim 5, wherein m=2 and n is equal to one of 2, 3, 4, 5, or 6.

8. The apparatus of claim 5, wherein the n number of semiconductor laser array units is at least two and each of the least two semiconductor laser array units having at least two light emitting points which are arranged in a row in the sub scanning direction and separated from each other.

9. The apparatus of claim 8, further comprising a plurality of coupling lenses arranged to couple beams emitted from the light emitting points.

10. The apparatus of claim 9, wherein each of the plurality of coupling lenses corresponds to a respective one of the at least two semiconductor laser array units.

11. The apparatus of claim 5, wherein the n number of semiconductor laser array units is at least two and the at least two semiconductor array units each have at least two light emitting points per unit and the at least two semiconductor array units have a non-aligned relationship relative to each other in the sub-scanning direction.

12. The apparatus of claim 5, further comprising an image forming optical system which is arranged between the at least two light emitting points and the scanning surface with common focal characteristics for each beam and which is arranged to condense the beams from the light emitting points on the scanning surface as beam spots separated from each other in the sub scanning direction.

13. The apparatus of claim 12, wherein a lateral magnification of the image forming optical system is $\beta$, a scanning line pitch of the m×n number of scanning lines on the scanning surface is L, an interval between the light emitting points of the semiconductor laser array units is p, the number of the semiconductor laser array units is n, and the lateral magnification and the scanning line pitch L are set such that n is evenly divided by $\{(p \times |\beta|)/L\}$.

14. The apparatus according to claim 13, wherein when n is 2, $\{(p \times |\beta|)/L\}$ is equal to 1 or 2.

15. The apparatus according to claim 13, wherein when n is 3, $\{(p \times |\beta|)/L\}$ is equal to 1 or 3.

16. The apparatus according to claim 13, wherein when n is 4, $\{(p \times |\beta|)/L\}$ is equal to 1, 2 or 4.

17. The apparatus according to claim 13, wherein when n is 6, $\{(p \times |\oplus|)/L\}$ is equal to 1, 2, 3, or 6.

18. The apparatus of claim 13, wherein a difference between adjacent beam spots on the surface to be scanned is less than the scanning line pitch L.

19. The apparatus of claim 5, further comprising n number of coupling lenses, wherein the n number of semiconductor laser array units and the n number of coupling lenses are integrated in a single unitary body and positioned such that light beams emitted from the semiconductor laser array units and coupled by the coupling lenses cross each other in a main scanning direction.

20. The apparatus of claim 5, wherein the beam synthesizing device is constructed to synthesize the beams coupled by the at least one coupling lens using a difference in a polarized state of each beam.

21. An image forming apparatus comprising:

n number of semiconductor laser array units, each of the n number of semiconductor laser array units having m number of light emitting points, where n is greater than 1 and m is greater than 1;

at least one coupling lens arranged to couple beams emitted from the light emitting points of the laser semiconductor array units;

a beam synthesizing device arranged to synthesize the coupled beams to obtain m×n number of beams; and an optical deflector arranged to deflect the m×n number of beams at substantially the same time such that the deflected beams are impinged on a scanning surface, wherein the light emitting points of the semiconductor laser array units are inclined in a direction that coincides with the sub-scanning direction.

22. The apparatus of claim 21, wherein n=2 and m is equal to one of 2, 3, 4, 5 or 6.

23. The apparatus of claim 21, wherein m=2 and n is equal to one of 2, 3, 4, 5 or 6.

24. The apparatus of claim 21, wherein the n number of semiconductor laser array units is at least two and each of the at least two semiconductor laser array units having at least two light emitting points which are arranged in a row in the sub scanning direction and separated from each other.

25. The apparatus of claim 21, wherein the n number of semiconductor laser array units is at least two and the at least two semiconductor laser array units each have at least two light emitting points per unit and the at least two semiconductor array units have a non-aligned relationship relative to each other in the sub scanning directions.

26. The apparatus of claim 21, further comprising an image forming optical system which is arranged between the at least two light emitting points and the scanning surface with common focal characteristics for each beam and which is arranged to condense the beams from the light emitting points on the scanning surface as beam spots separated from each other in the sub scanning direction.

* * * * *